Nov. 6, 1945.　　　　R. I. MARKEY　　　　2,388,489
FIRE CONTROL
Filed Oct. 6, 1941　　　　2 Sheets-Sheet 2

INVENTOR
ROSCOE I. MARKEY
BY
ATTORNEY

UNITED STATES PATENT OFFICE 2,388,489

FIRE CONTROL

Roscoe I. Markey, East Orange, N. J., assignor to Pollak Manufacturing Company, Arlington, N. J., a corporation of New Jersey Application October 6, 1941, Serial No. 413,786

1 Claim. (Cl. 89—28)

The invention relates to a fire control for a machine gun, and more particularly to aircraft machine guns.

One of the principal objects of the invention is to provide a gun firing unit of considerably lighter weight than standard types in use and one that uses only about one-half the electric energy of those in use at present.

Another object is to provide a gun firing unit that will not require any installation space beyond that of the gun itself. This is particularly important in aircraft installations where space is always a vital factor.

A further object is to provide a unit of such simplicity that it may be installed with the greatest of ease and the correctness of installation may be checked by visual inspection without the use of instruments.

A still further object is the provision of means whereby the unit may be manually operated instead of electrically and, if desired, it may be manually operated by remote control.

Other objects and advantages will become apparent as this specification proceeds. Referring to the drawings forming a part thereof and in which a preferred form of the invention is illustrated:

Figure 1:
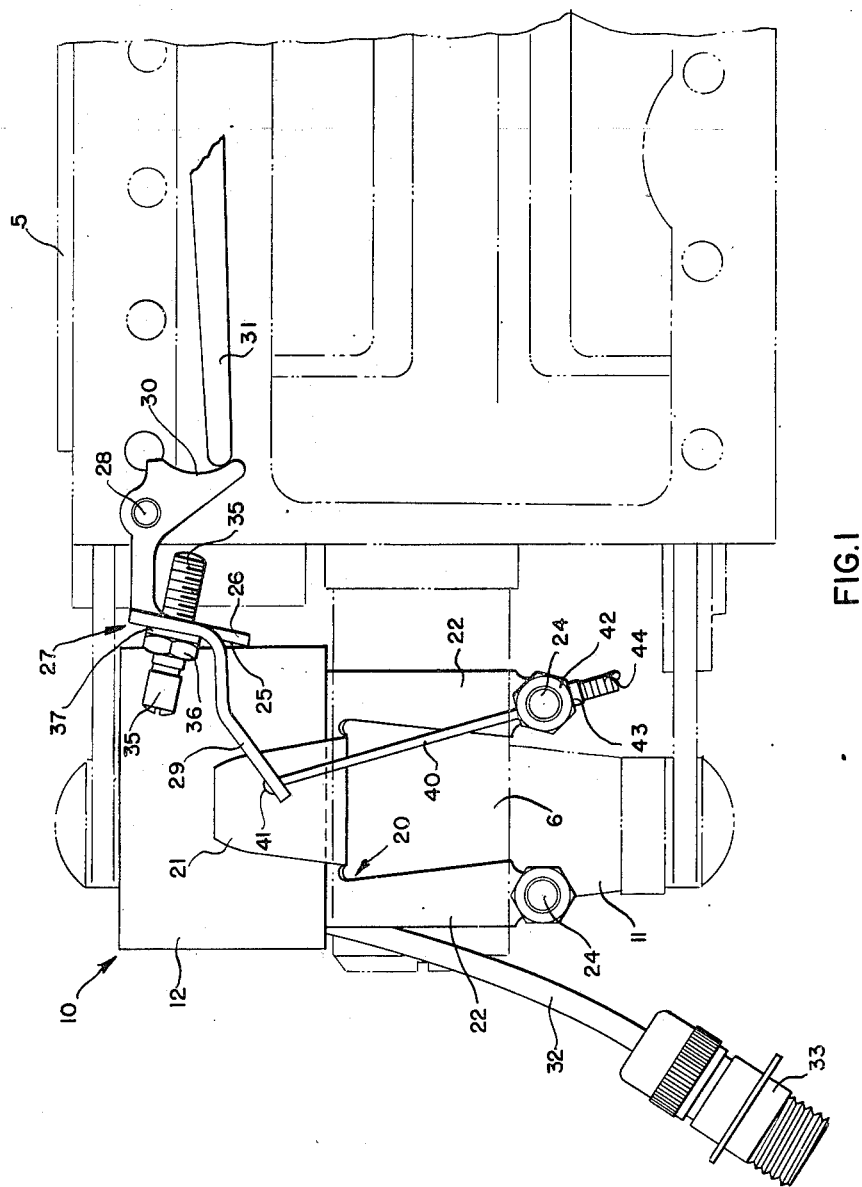
Fig. 1 is a side elevation of the fire control unit, the gun being shown schematically in light lines.
Figure 2:
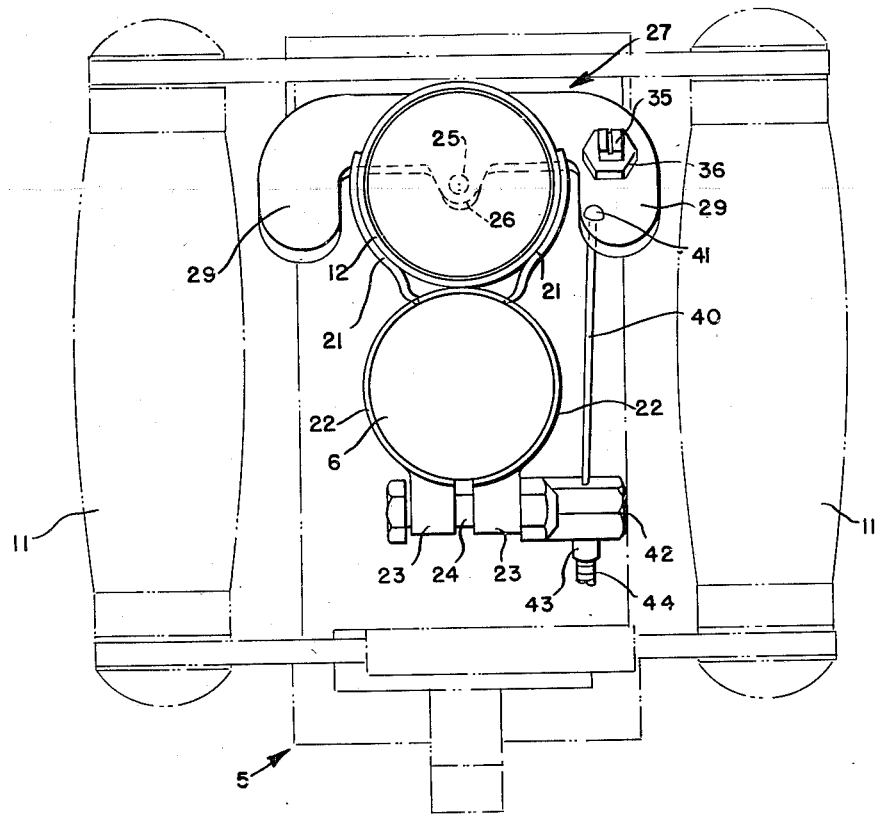
Fig. 2 is an end elevation.
Figure 3:
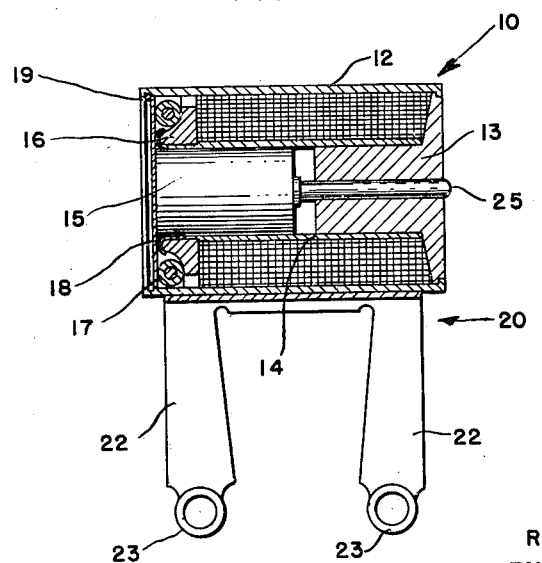
Fig. 3 is a detail longitudinal sectional view.

Referring again to the drawings the reference number 5 designates the machine gun. The machine gun is provided with the conventional slidable rear plate on which is mounted the buffer tube 6. The buffer tube 6 contains the usual spring for helping to absorb the recoil and in the present instance functions as a mount for the improved fire control or gun firing unit generally designated by the reference numeral 10.

It is customary to mount gun firing units on the side of the machine gun, thus taking up additional space. It will be noted in the present arrangement the gun firing unit rests between the spade grips 11 and does not extend beyond the end of the buffer tube 6. Thus it requires no installation space beyond that for the gun itself.

The unit proper is formed of a solenoid comprising the outer casing 12 into the forward end of which is fitted a closure and guide member 13. A sleeve 14 encircles the guide member 13 and the solenoid core 15. The solenoid winding is confined between the outer casing 12 and the sleeve 14. Positioned in the rear end of the solenoid is a flanged disc 16 which is held in place by spinning the end of the sleeve 14. A flexible lead out wire 17, soldered to the end of the coil winding, is confined between the flanged disc 16 and an annular plate 18. A locking ring 19 springs into a suitable groove in the outer casing 12 and holds the plate 18 in position. The details of the solenoid construction might be widely varied.

The solenoid is mounted on the buffer tube 6 by means of a suitable fitting 20. This fitting is stamped out of one piece of material and has a pair of arms 21—21 which partially embrace the solenoid and are secured thereto. It also has two pairs of arms 22—22 which embrace substantially all of the circumference of the buffer tube. The extremities of the arms 22 have short sleeves 23 welded or otherwise secured thereto and bolts 24 passing through the two alined pairs of sleeves rigidly hold the solenoid in the proper position on the buffer tube.

A pin 25 is slidably mounted for longitudinal movement in the guide member 13 of the solenoid. This pin engages an ear 26 formed on the trigger 27 which is pivoted at 28 on the gun. The trigger has the usual rearwardly and laterally extending finger pieces 29 for manual operation of the gun.

A curved seat 30 is formed in the rear part of the trigger for engagement with the trigger bar 31. The trigger bar is of conventional construction and has the usual spring (not shown) for urging the parts of the position of Fig. 1, thus eliminating the necessity of providing a spring in the solenoid to retract the core 15 and pin 25.

From the foregoing it is thought to be apparent that the gun may be fired manually by pressure on the finger pieces 29 of the trigger without disturbing or interfering with the electric control should the source of electric energy at any time fail. It is also thought to be apparent that each time the solenoid is energized its core 15 will cause the pin 25 to operate the trigger to fire the gun. Current is supplied to the solenoid through wires encased in a flexible cable 32 at the end of which is secured a suitable cable adapter 33.

Adjustable stop means for the trigger are provided to prevent the solenoid from overloading the trigger bar and reducing the rate of gun fire. This adjustable stop means comprises a stud 35 threaded into one of the lateral finger pieces 29 and held in its proper position by a lock nut 36 and lock washer 37. The stud 35 is set so as to provide the proper amount of movement of the pin 25 to fire the gun and the inward end of the stud engages some fixed part of the gun thus preventing undue or excess movement of pin 25.

In aircraft installations the space ofttimes is so limited in the turret that a gun cannot be operated by hand. It is therefore desirable in such instances to provide a remote control for manually operating the gun. A flexible cable 40 has one end secured at 41 to either one of the finger pieces 29 depending upon which is more convenient. One of the bolts 24 which secure the arms 22 together has a long nut 42 into which is inserted a sleeve 43. One end of a bowdenite casing 44 is secured in the sleeve 43 and the flexible cable 40 enters the bowdenite casing thus providing for remote manual control.

Such changes in details of construction and arrangements of parts as would occur to one skilled in the art are to be considered as coming within the spirit of the invention as set forth in the appended claim.

I claim:

In an automatic firearm including two spaced spade grips and a buffer tube all extending rearwardly from the gun, said buffer tube being positioned between the spade grips; a gun firing control comprising a trigger for firing said gun, said trigger pivotally mounted on the rear of the gun and having a finger piece extending therefrom to a position adjacent one of said spade grips, a solenoid for electrically actuating said trigger, said solenoid constructed and arranged to have an overall length less than the length of the buffer tube, means mounting said solenoid on the buffer tube, with the longitudinal axis of said solenoid parallel with axis of said buffer tube and with the full length of the solenoid located between the ends of said buffer tube, a pin within said solenoid and constructed and arranged to be moved by said solenoid when the solenoid is energized, said trigger having a portion offset from the pivot thereof and extending into the path of movement of said pin, whereby operation of said solenoid will actuate the trigger for gun firing.

ROSCOE I. MARKEY.